Aug. 17, 1937.                C. D. CARD                2,090,184
              CIRCUIT CLOSING DEVICE FOR FLAT TIRE INDICATION
                          Filed Feb. 21, 1935
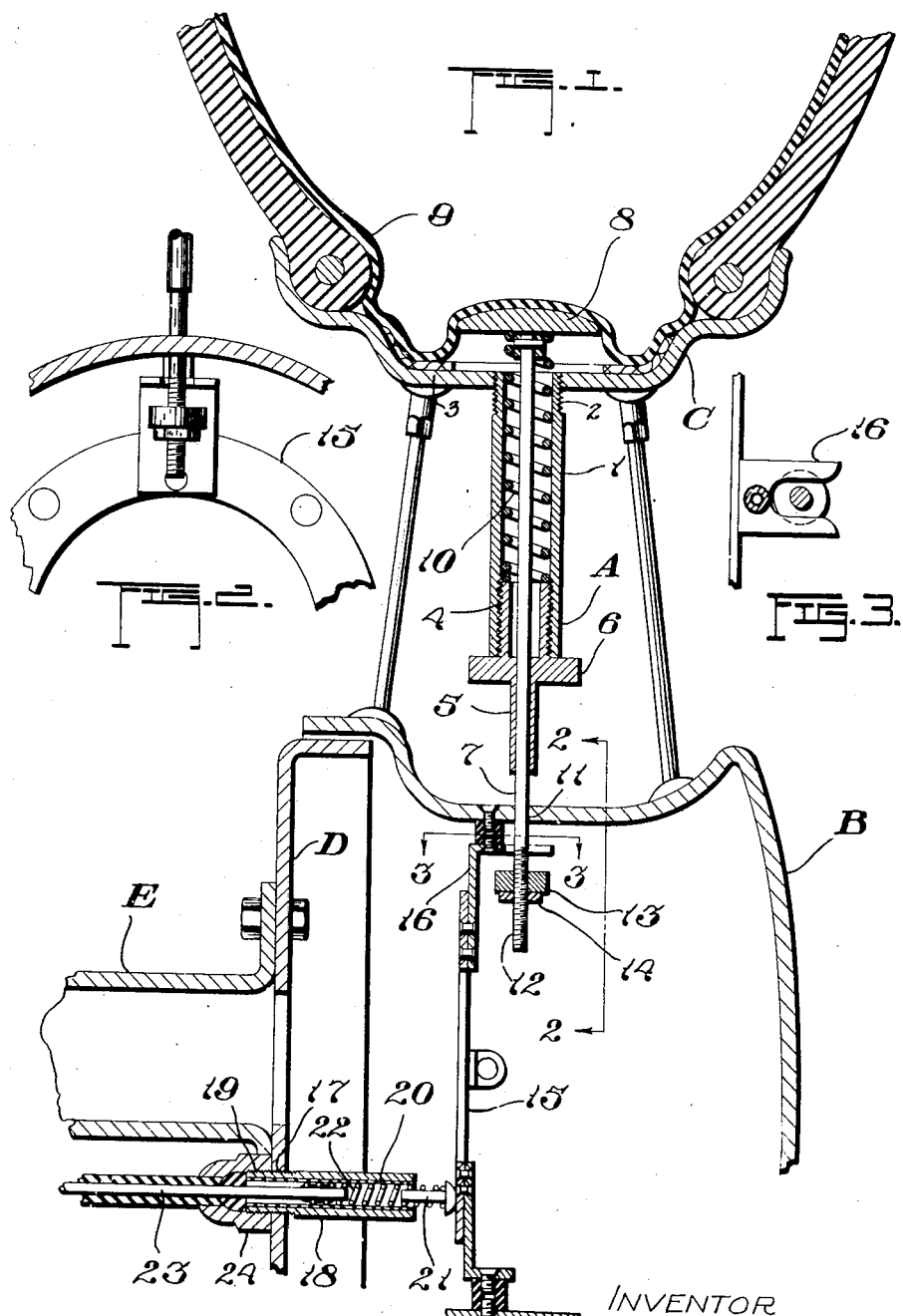
INVENTOR
C. D. CARD
BY
ATTYS.

Patented Aug. 17, 1937

2,090,184

UNITED STATES PATENT OFFICE 2,090,184

CIRCUIT CLOSING DEVICE FOR FLAT TIRE INDICATION

Clarence D. Card, Rivers, Manitoba, Canada, assignor to Automatic Tire Pressure Indicator Company of Manitoba, Rivers, Manitoba, Canada Application February 21, 1935, Serial No. 7,611

1 Claim. (Cl. 200—58)

My invention relates to improvements in circuit closing devices for flat tire indicators and an object of the invention is to provide a device of the character herein described which will close an electrical circuit to actuate a signal within the automobile when the air in the tire with which the device is used, falls to a predetermined pressure.

A further object of my invention is to provide a device of the character herein described which, in conjunction with an electrical signalling means, will enable the driver of an automobile to maintain each tire at the correct pressure, thereby lengthening the life thereof and increasing the riding comfort of the occupants.

A still further object of my invention is to provide a device of the character herein described which may be completely enclosed by the hub cap of the automobile wheel to exclude dust, etc., is positive in action, rugged in construction, and will not easily become out of order.

With the above more important objects in view, and such other minor objects as may appear as the specification proceeds, my invention consists essentially in the arrangement and construction of parts all as hereinafter more particularly described, reference being had to the accompanying drawing, in which:—

Fig. 1 is a sectional elevation of my invention in situ upon the wheel of a car and bearing against the inner tube within the wheel rim.

Fig. 2 is a section upon the line 2—2 of Figure 1.

Fig. 3 is a plan view of the projecting bracket on the collecting ring.

In the drawing like characters of reference indicate corresponding parts in the several figures.

My invention consists of a tire pressure unit A which extends between the hub B of an automobile and the rim C of the wheel. This unit consists of a housing 1 externally screw threaded as at 2 to be received into a screw threaded orifice 3 in the rim C. The housing is internally screw threaded as at 4 at its opposite end and into this end is screwed a reduction sleeve 5, this reduction sleeve being supplied with a hexagonal nut 6.

A control shank 7 extends through the housing 1 and through the orifice into which it is fitted in the rim and is provided at its end with a domed pressure head 8 designed to bear against the inner tube 9. A coiled spring 10 extends inside the housing and one end of this coiled spring is designed to bear against the domed pressure head and the other against that end of the reduction sleeve which is within the housing 1.

The control shank 7 extends through an orifice 11 in the hub B, the end of the shank being screw threaded as at 12. A screw threaded contact point 13, which may be in the form of an ordinary nut, is screwed onto the shank and is locked by means of a jam nut 14.

Mounted centrally within the hub and suitably insulated, is a collector ring 15, this ring being provided at one point upon its periphery with a bifurcated bracket 16.

Extending through a tapped orifice 17 in the brake drum D and adjacent the axle housing E is a casing 18 screw threaded at one end as at 19. The interior of this casing is suitably insulated as at 20 and is provided with an insulated brush 21 which is designed to bear against the collector ring 15 as the latter rotates. A light spring 22 is housed within the casing for the purpose of pressing the brush 21 against the ring 15.

The end of an insulated lead 23 extends through the casing being soldered to the spring 22 thereby making contact with the brush 21, the end of the lead being suitably secured by means of a terminal socket 24 secured to the orifice 17 upon the braking drum D.

The construction of my device having now been specified, its operation will be explained.

The tires are pumped up to any given pressure and so long as this pressure is maintained, the domed pressure head 8 which bears against the inner tube 9 will be held in a compressed position so that the contact point 13 upon the control shank 7 to which the pressure head 8 is attached, will be held clear of the bifurcated surfaces of the bracket 16, it being understood that the shank is of substantially smaller diameter than the width apart of the arms of the bracket. In the event, however, of the pressure within the tire becoming for any reason decreased, such as by leakage, the spring 10 will press the head 8 downwardly, thereby enabling contact to be made between the collector ring 15, the bracket 16, the contact point 13 and the shank 7. When contact is thus made, a circuit is grounded and the particular lamp to which the lead 23 from that tire in which the pressure has become decreased, is lighted and the controller of the automobile may immediately be warned that his tire needs attention.

In order to make my device register a reduction from any given pressure within the tire, I have arranged the reduction sleeve 5 so that it can be turned to right or left by means of the nut 6, thus when the nut is turned one way, the spring 10 will be compressed in cases where a higher pressure is to be normally maintained within the tire and turned the other way to slacken the spring when a lower pressure is desired to be maintained.

If desired, I may line the edges of the bifurcated bracket with insulating material so that there will be no possibility of the shank 7 touching the bracket but when the device is rigidly constructed, I do not think this will be necessary.

Since various modifications can be made in the above invention, and many apparently widely different embodiments of same, made within the scope of the claim without departing from the spirit and scope thereof, it is intended that all matter contained in the accompanying specification shall be interpreted as illustrative only and not in a limiting sense and I desire only such limitations placed thereon as are specifically expressed in the accompanying claim.

What I claim as my invention is:—

Improvements in tire pressure indicating means for automobiles, comprising in combination, a sleeve attached to, and extending centrally from the inner surface of the rim of an automobile, a reduction sleeve inserted into said first mentioned sleeve, a control shank passing through said sleeves and extending through said wheel rim and into the hub of said wheel, a domed pressure head affixed to one end of said control shank, said head being adapted to bear against an inner tube upon said rim, a terminal upon the opposite end of said shank to the said head, spring means within said sleeve and around said control shank for maintaining said head in contact with said inner tube, said reduction sleeve being designed to adjust the pressure of said spring means against said head, a rotatable insulated collector ring within said hub, a bifurcated bracket attached to said ring and contactible by said terminal, a cylindrical member extending through the brake drum of said automobile wheel, an insulated spring within said cylindrical member, a brush mounted upon said spring, said brush being in contact with said collector ring, and an insulated conductor attached to, and extending from said spring.

CLARENCE D. CARD.